United States Patent [19]

Katz et al.

[11] Patent Number: 4,990,173

[45] Date of Patent: Feb. 5, 1991

[54] HYDROPHILIC MUSHROOM GROWTH SUPPLEMENT AND METHOD OF USING SAME

[75] Inventors: Hirschel A. Katz; George W. Pratt; Duane O. Tackaberry, all of Cedar Rapids, Iowa

[73] Assignee: Penford Products Co., Cedar Rapids, Iowa

[21] Appl. No.: 364,485

[22] Filed: Jun. 9, 1989

Related U.S. Application Data

[63] Continuation of Ser. No. 169,883, Mar. 18, 1988, abandoned, which is a continuation-in-part of Ser. No. 047,825, May 8, 1987, abandoned.

[51] Int. Cl.$^5$ .............................................. C05F 11/08
[52] U.S. Cl. ........................................ 71/5; 71/904; 47/1.1

[56] References Cited

U.S. PATENT DOCUMENTS

| | | | |
|---|---|---|---|
| 2,876,160 | 3/1959 | Schoch | 167/82 |
| 3,455,838 | 7/1969 | Marotta | 252/316 |
| 3,560,190 | 2/1971 | Hughes, et al. | 71/5 |
| 3,828,470 | 8/1974 | Stooler | 47/1.4 |
| 3,922,354 | 11/1975 | Galluzzi et al. | 426/96 |
| 3,942,969 | 3/1976 | Carroll et al. | 71/5 |
| 3,962,416 | 6/1976 | Katzen | 424/419 |
| 4,230,687 | 10/1980 | Sair | 424/22 |
| 4,332,792 | 6/1982 | Kohn et al. | 424/84 |
| 4,333,757 | 6/1982 | Kurtzman, Jr. | 71/5 |
| 4,370,159 | 1/1983 | Holtz | 71/5 |
| 4,420,319 | 12/1983 | Holtz | 71/5 |
| 4,421,543 | 12/1983 | Holtz | 71/904 |
| 4,443,969 | 4/1984 | Hanacek et al. | 71/5 X R |
| 4,534,781 | 8/1985 | Wu et al. | 71/5 |
| 4,594,809 | 6/1986 | Ower et al. | 47/1.1 |
| 4,617,047 | 10/1986 | Bretzloff | 71/5 |
| 4,818,268 | 4/1989 | Holtz | 71/5 |

FOREIGN PATENT DOCUMENTS

2142326 6/1984 United Kingdom.
2180529 9/1986 United Kingdom.

OTHER PUBLICATIONS

Randle, Phyllis E., "Supplementation of Mushroom Compost-A Review", *Mushroom, Journal*, Jul. 1985, v151, pp. 241-249.

Randle, Phyllis E., "Supplementation of Mushroom Compost-A Review, Part 2", *Mushroom Jrnl.*, Jul. 1985, v152, pp. 263-269.

Gerrits, J. P. G., "Supplementation with Formaldehyde Treated Soya Bean Meal", *Mushroom Jrnl.*, May, 1986, v161, pp. 169-174.

Shasha, B. S., W. M. Doane and C. R. Russell, "Starch-Encapsulated Pesticides for Slow Release", Polymer Letters Edition, Vol. 14, pp. 417-420, (1976).

Otey, Felix H. and W. M. Doane, *Starch: Chemistry & Technology*, 2nd ed., (1984), Whistler & Bemiller, Chapter XI, Section 2, "Starch Santhide Encapsulation", pp. 410-416.

Trimnell, D., B. S. Shasha, R. E. Wint and F. H. Otey, "Pesticide Encapsulation Using a Starch-Borate Complex as Wall Material", Journal of Applied Polymer Science, vol. 27, pp. 3919-3928, (1982), John Wiley & Sons, Inc., Publisher.

Trimnell, D., B. S. Shasha and F. H. Otey, "The Effect of a-Amylases Upon the Release of Trifluralin Encapsulated in Starch", Elsevier Science Publishers B. V., 1985, pp. 183-190.

Wing, R. E., S. Maiti and W. M. Doane, "Factors Affecting Release of Butylate From Calcium Ion-Modified Starch-Borate Matrices", Journal of Controlled Release, (1987), Elsevier Science Publishers, pp. 79-89.

*Primary Examiner*—Ferris H. Lander
*Attorney, Agent, or Firm*—Marshall, O'Toole, Gerstein, Murray & Bicknell

[57] ABSTRACT

A nutrient supplement for enhancing the growth of mushrooms in a compost bed is disclosed. The supplement comprises a protein material (e.g., corn gluten meal) coated with a hydrophilic carbohydrate material.

17 Claims, No Drawings

HYDROPHILIC MUSHROOM GROWTH SUPPLEMENT AND METHOD OF USING SAME

RELATED APPLICATIONS

This application is a continuation, of application Ser. No. 07/169,883, filed Mar. 18, 1988, and now abandoned, which is a continuation-in-part of application Ser. No. 47,825 filed May 8, 1987 and now abandoned.

BACKGROUND OF THE INVENTION

1. Field of the Invention

The present invention relates generally to mushroom cultivation, and more particularly to an improved nutrient supplement for promoting mushroom growth.

2. Description of the Prior Art (A) Commercial Growing Practices

Commercial mushroom cultivation is essentially a four-phase operation employing the following steps:

(1) composting - forming a nutrient substrate (compost bed) upon which mushrooms can be grown;

(2) spawning - impregnating the compost bed with mushroom mycelia;

(3) casing - after the mycelia have suitably developed, covering the mycelia-permeated compost bed with a layer of soil, peat, or sand; and (4) harvesting or "cropping" the developed mushrooms. The mushroom growth process exhausts the necessary nutrients from the compost bed. As a result, after the mushroom crop has been harvested, the nutrient-depleted compost bed is discarded and the cultivation operation is repeated.

Commercial mushroom facilities utilize composted organic materials prepared from a mixture of cereal straws, organic fertilizers, and other nutrients. The action of microorganisms on the straw/fertilizer/nutrient mixture results in a substrate which is selective for the colonization of mushrooms without undo competition from other fungi or microorganisms. In addition to providing a substrate upon which mushrooms can be grown, the compost serves as a source of nutrients essential for mushroom growth.

The prepared compost is preferably pasteurized in order to deactivate any residual microorganisms and then is impregnated with mushroom inocula (mycelia) in a step referred to as "spawning". Thereafter, the mycelium-impregnated compost is maintained at controlled conditions for a period of two to three weeks until the hyphae of the mycelium have permeated the compost.

The next stage of commercial mushroom production, referred to as "casing", involves covering the mycelia-permeated (colonized) compost with a thin layer of peat (preferably buffered with calcium carbonate), soil or sand. This allows the mushrooms to fruit or "flush".

The first flush of mushrooms generally occurs approximately three weeks after casing. After harvesting this first flush (or "break"), the commercial bed will produce two to four additional flushes or breaks until the compost becomes sufficiently depleted of essential nutrients so a to become uneconomical. The compost is then discarded.

(B) Use of Growth-Enhancing Supplements

Enhanced mushroom yields can be obtained by adding supplementary nutrients either to the compost bed (after completion of the composting step) or to the mycelia-impregnated compost up to the time of casing. Addition of nutrients after casing is generally no beneficial.

Most commercially-employed nutrient supplements are proteinaceous in nature; both animal and vegetable-derived materials have been utilized. Although these protein supplements are relatively expensive, they have been shown to produce sufficiently enhanced yields to be economically attractive. Up until now, the presence of larger amounts of carbohydrates in supplements has been perceived as being detrimental to mushroom yields.

The addition of available supplementary nutrients can result in adverse effects to the mushroom crop. In addition to fostering mushroom growth, directly utilizable nutrients can be metabolized by competing, faster-growing microorganisms present in the compost bed. Consumption of nutrients by competing organisms has two deleterious effects: not only is the expensive nutrient removed from its intended use as a mushroom growth supplement, but the intense microbial activity also acts to raise the temperature of the mushroom bed. High temperatures have adverse effects on mushroom mycelia, and can destroy the growing mushroom crop.

Another difficulty with the use of directly utilizable supplements is that enhanced yields are observed only in the first flush. That is, by the advent of the subsequent flushes, the added nutrient supply has been reduced or even exhausted and little yield stimulation is observed.

One approach to dealing with the problem resulting from nutrient-rich systems is to retard the rate of release of the nutrient from the supplement. In Carroll, et al. U.S. Pat. No. 3,942,969, this retardation is accomplished by denaturing a protein-containing supplement with heat or chemicals prior to adding the nutrient supplement to the compost bed. Denatured protein is reported to greatly lessen the availability of the nutrient to competing microorganisms while maintaining its availability to the growing mushrooms. The patent also teaches that the presence of carbohydrates in the supplements is objectionable, but that such materials can be tolerated in small amounts. The gains in mushroom yields resulting from the process described in the foregoing patent are at least partially offset by the economic costs involved in the denaturing step.

Another approach to the problem resulting from the use of directly-utilizable nutrient supplements is illustrated in Wu, et al. U.S. Pat. No. 4,534,781, which utilizes a hydrophobic material (e.g., paraffin wax or shellac) to coat a protein-containing nutrient supplement. The patent teaches that such a coating will resist attack by competing organisms and will delay the availability of the nutrient to the mushroom mycelia until the coating is gradually removed during the mushroom growth period. The patent teaches that one advantage of the hydrophobic coating is the lessening of hydration of the nutrient supplement. Since most molds require moisture for growth, the presence of such a hydrophobic coating eliminates an essential requirement for rapid growth of such competing microorganisms.

BRIEF DESCRIPTION OF THE INVENTION

The present invention provides an improved nutrient supplement which enhances mushroom growth while avoiding the effects of competing microorganisms. The supplement does not require denaturing. Moreover, unlike prior art coated nutrient compositions, the compositions of the present invention comprise a protein-rich substrate which is coated with a hydrophilic coating. This coating, by whatever mechanism, controls the availability or accessibility of the protein present to mushroom mycelia, thereby exhibiting yield-enhancing effects in later flushes, prolonging the life of a compost bed.

The novel hydrophilic supplement has several advantages including:

1. Increased mushroom yield;
2. Increased manufacturing economy, i.e., both the protein source employed and the processing is economical;
3. Increased economy due to reduction in the quantities of nutrient required to obtain superior yields;
4. The supplement may be added at the time of "spawning" or up to the time of "casing";
5. The supplement results in greatly reduced "heating" per unit protein, which permits increased usage levels for even greater yields;
6. The supplement exhibits uniform flow and feeding properties;
7. The supplement can be used without generating excessive amounts of dust, requiring dust control measures - dust masks, dust collection systems;
8. Although the protein supplement contains a carbohydrate, the material is in a form which does not lead to overheating; and
9. The protein supplement results in increased yields beyond the first break.

DETAILED DESCRIPTION OF THE INVENTION

The hydrophilic nutrient compositions of the present invention are granular materials which contain two essential components: a minor amount of an outer, hydrophilic coating (up to 25% by dry weight); and, a major amount of a protein-rich, inner core or substrate (from 75 to 99% by dry weight).

The proteinaceous material employed in the supplement can be of animal or vegetable origin. Protein-containing materials such as casein, whey, cottonseed meal, soy bean meal, soy protein, corn gluten feed, corn gluten meal, wheat gluten are suitable, with corn gluten meal, corn gluten feed, soy bean meal, and soy protein being preferred. Other materials which are known to enhance the growth of mushroom mycelium could also benefit from a hydrophilic coating.

In order to obtain the full advantages of the present invention, the proteinaceous material is preferably non-denatured. That is, for reasons of economy, the protein-containing material is not subjected to a separate heat or chemical denaturing step such as that described in U.S. Pat. No. 3,942,969. The term "non-denatured" as used herein is meant to include protein-rich materials which may have been partially or incidentally denatured during conventional processing (e.g., drying of wet-milled grain). Although non-denatured proteinaceous materials are preferred for reasons of cost, even denatured protein may benefit from the hydrophilic coating.

The nutrient supplements of the present invention contain from 5 to 95% protein with 55–75% being preferred based on the dry weight of the total composition. Vitamins, minerals and growth enhancers could also be incorporated into the proteinrich material.

The protein substrate may be pasteurized prior to coating, by heating from 140°–150° F. for a period of time. Also, the final coated product may be pasteurized if desirable. However, pastuerization is not normally necessary.

The material to be coated will desirably be of low moisture to reduce the need for drying after coating. Thus, an initial moisture content of less than 20%, preferably less than 12%, is preferred for the protein-rich substrate.

The hydrophilic material utilized to coat the protein-rich substrate is a carbohydrate. Suitable coating materials include starch, modified starch, starch derivatives, modified starch derivatives, cellulose, cellulose derivatives, guar, guar derivatives, gum arabic, and other polysaccharides, with starch being preferred, and a cross-linked starch of reduced viscosity being most preferred.

The terms "starch derivative" and "modified starch derivatives" are familiar to those in the art and refer to materials which have been chemically substituted and/or crosslinked. The term "modified", as used herein, means "depolymerized", i.e., the molecular weight of the starch has been reduced by one of the several conventional methods known to those in the art.

The aqueous hydrophilic dispersion can be applied to the proteinaceous substrate in any of the many ways familiar to those skilled in processing of granular materials. The hydrophilic material is usually first dissolved or dispersed in water, with the water kept to a minimum to reduce or eliminate subsequent drying. The resultant dispersion should have a low viscosity so as to be pumpable or easily handled.

A favored procedure is to use a limited dispersion of the hydrophilic material in water. By limited dispersion it is meant that the starch is only partially hydrated in water, having a viscosity in the range of 100 to 10,000 centipoise, such that it can be pumped and sprayed.

A preferred cooking process for preparation of the hydrophilic coating involves heating a starch slurry containing up to 40% (by weight) dry substance (preferably 25–35%) to a temperature where the starch granules start to swell. This condition is signaled when the slurry viscosity starts to increase, generally at a temperature between 145–175° F. (For the present coating application, heating to a temperature of 150–160° F. is most preferred). Those skilled in the art are aware of this property, and adept at recognizing the onset of the phenomenon, referred to as "starch pasting". Various methods can be used to heat the starch slurry, viz, a jacketed kettle, use of live steam, etc.. A specially preferred heating method employs a scraped surface heat exchanger.

Once the starch has been partially pasted in accordance with the above procedures, storage conditions may be chosen to control thickening. This can be accomplished by reducing the temperature a few degrees, (e.g., 2–5° F.), and/or limiting time and storage. The partially pasted starch will have a Brookfield viscosity of 100–10,000 centipoise with 250–2500 cps being preferred.

Other methods of pasting starch familiar to those in the art can be utilized, including: i) stirring a dispersion of 1–45% solids starch in water while heating the dispersion to 160°–212° F. for 10–30 minutes or longer; and, ii) the process of "jet cooking" such as is described in U.S. Pat. No. 3,133,836. Regardless of the method employed, the resultant paste ideally has a viscosity such that the paste can be readily pumped and applied to the protein substrate such as by spraying.

The amount of coating applied to the nutrient substrate is not thought to be critical. Coating levels within the broad range of 1%–25% by weight (dry add-on based on dry substrate) may be suitable for certain applications. However, coating levels of 2-5% are generally preferred. Conventional spraying or mixing techniques can be employed.

The preferred nutrient substrates should be generally free from mold spores. If desired, microorganism inhibiting compounds, such as those outlined in U.S. Pat. No. 4,617,067, may be added during the supplement preparation process.

After completion of the spraying or mixing process, the resulting coated composition can be dried. Evaporation of the water from the deposited coating composition leaves a dried residuum of carbohydrate on the surface of the granular nutrient substrate. The uniformity of coating on the nutrient granules is not critical. Some non-uniformity may even be preferred. Methods of drying are not critical and include those generally used in commercial materials processing, such as tunnel drying, fluid bed drying, rotary drum drying, tray drying, etc.

The resulting composition can be used as a mushroom supplement, either at the time of spawning or up to the time of casing. Surprisingly, the presence of this additional carbo-hydrate-containing material does not result in the problems predicted by the prior art. Indeed, it is believed that the carbohydrate present results in improved nutrition for the growing mushroom.

The nutrient supplement described in this invention is added to a suitably prepared compost. Procedures for preparation of a compost are varied, but understood by those skilled in the art. The nutrient supplement is generally added at a rate of 1.4 to 14% based on dry weight. This rate will vary with each mushroom growers particular conditions, such as temperature, moisture, mushroom variety, compost composition, etc..

An upper limit of addition is usually determined when over heating occurs. This in turn depends upon the conditions described above, as well as the design of the growing facility. Such factors as air flow, cooling capacity, bed depth, etc. come into play.

The hydrophilic nutrient supplement is generally added at spawning, but, as noted above, can be added from spawning up to the time of casing. One feature resulting from use of the supplement which has been observed is vigorous growth of the mushroom mycelia (i.e., pre-casing growth). This vigorous initial growth is thought to lead to a greater yield of mushrooms at fruiting, and also to result in mushrooms of higher quality.

Proper use of the supplement does not result in high temperatures which damage the mushroom mycelia. Indeed, over heating during the mycelium-growth period is reduced such that increased usage levels of protein, at a higher level than those heretofore normally used, are possible. This results in the production of more mushrooms per batch of compost, and greater operating efficiency.

The admixture of hydrophilic material with the finely ground proteinaceous material at a 2 to 5% level results in a product that has about the same particle size as the starting proteinaceous material, but improved flow properties. This has resulted in a product which flows very well in the application hopper at a mushroom farm. Also a very even flow rate has been observed with increased evenness of performance throughout all of the trays or batches.

Surprisingly, the hydrophilic coating gives another benefit. The final product is almost dust free. Bags of product can be emptied into the application hopper with no or little resulting dust. Workmen do not need to wear protective masks.

The addition of the hydrophilic coating of the present invention allows protein sources to be used, such as corn gluten meal, which were previously viewed as unsuitable because of their relatively high level of available nutrients. These nutrient sources are lower in cost than materials such as soy bean protein currently used in mushroom nutrients and result in a more economical growth supplement.

The following examples illustrate various embodiments of the present invention.

EXAMPLE A

A preferred composition for coating proteinaceous substrates is an acid modified, phosphate cross-linked starch which can be made by the following procedure:

A reaction tank was filled with commercially produced unmodified corn starch slurry containing approximately 35-40% dry substance starch. Then a saturated salt (NaCl) solution containing approximately 4.5% sodium hydroxide (NaOH) was slowly added to the starch slurry until the pH of the slurry was about 11.0. The slurry was then heated to 120° F. by injecting steam directly into the slurry. The steam injection was introduced at a point of high turbulence so that the heat was dissipated quickly and did not gelatinize or cook the starch. Then, 0.5% sodium trimetaphosphate (STMP) was added and allowed to react with the starch for 9 hours. When the STMP reaction period was completed, the slurry was neutralized with hydrochloric acid. In order to acid modify the starch, additional hydrochloric acid was added until the filtrate acidity was 1.05% HCl. The acid modification was continued until the starch had been depolymerized to an alkali fluidity of 40-45 mls on a 5 gram test. When the desired acid modification level was reached the starch slurry was neutralized to pH 5.5 using sodium carbonate. The starch was then washed to remove excess salt, filtered and dried. Analysis of the finished starch showed the moisture content to be 10.9%, the 5 gram alkali fluidity to be 44.5 mls, and the pH to be 6.4.

EXAMPLE 1

An acid modified, phosphate cross-linked corn starch derivative, prepared in accordance with Example A, was slurried at 31.6% dry solids. The slurry was slowly heated with agitation in a 30 gallon steam jacketed pilot plant tank to a temperature of 152° F., at which point the viscosity was judged to be suitable for application The semi-pasted starch was cooled to about 140° F. and then strained through a 9 mesh screen.

This semi-pasted starch was then sprayed at 135-140 psig onto 414 pounds of 9.8% moisture corn gluten meal in a pilot paddle mixer. A total of 40 pounds of semi-pasted starch (wet weight) was sprayed. Spraying time was 30 minutes. After spraying, the treated corn gluten meal was mixed for two hours. Final moisture was measured at 13.3%. Sieve analyses of the starting material and treated material are given below.

|          |      | Untreated | Treated |
| -------- | ---- | --------- | ------- |
| on U.S.  | #12  | 1.2%      | 1.1     |
|          | #20  | 21.8%     | 20.4    |
|          | #40  | 37.5%     | 37.5    |
|          | #100 | 31.9%     | 32.5    |

-continued

|  | Untreated | Treated |
|---|---|---|
| Pan | 7.8% | 8.4 |

The material was packed into 8-50 pound bags.

EXAMPLE 2

A second, phosphate cross-linked modified corn starch was prepared as a coating material following the same general procedure as described in Example A. The cooking or dispersing procedure was the same as that employed in Example 1, except instead of adding live steam to the jacket, hot water was used to heat the slurry to a temperature of 150° F., at which point the viscosity was judged to be suitable for application. The resultant starch slurry was measured at 32.0% solids.

Five thousand (5000) pounds of corn gluten meal were dried to an initial moisture below 9.5%. The dried meal was treated with the above-described dispersed starch at a level of 3.0% dry starch based on meal as is. Mixing was continued for 25 minutes after the addition of starch. Final moisture of the treated corn gluten meal was measured and found to be 13.4%. Sieve analyses are as follows:

|  |  | Untreated | Treated |
|---|---|---|---|
| on U.S. | #12 | 2.7% | 2.8 |
|  | #20 | 25.2% | 23.9 |
|  | #40 | 32.7% | 32.2 |
|  | #100 | 33.3% | 33.5 |
|  | Pan | 7.2% | 7.5 |

The product was packed into 50 pound bags.

EXAMPLE 3

Five thousand pounds (100 bags) of the product from Example 2 were used by a commercial mushroom grower. The bags were used in a test which compared the product of Example 2 with a formaldehyde cross linked (denatured) soy bean based supplement, which is understood to have been prepared in accordance with the procedure of U.S. Pat. No. 3,942,969. Usage rates for the treated corn gluten meal of Example 2 were 0.159–0.173 lbs per square foot of tray and for the cross linked soy bean product of the prior art 0.218–0.236 lbs per square foot of tray.

Three separate production runs were conducted. The results are set forth in Table I, with yields of harvested mushroom expressed in pounds per square foot of tray.

It can be seen from the data that final yields were similar for the two products despite the use of considerably lower levels of treated corn gluten meal supplement.

TABLE I

|  | 1st Break | 2nd Break | Total |
|---|---|---|---|
| Crop 1 |  |  |  |
| Treated Corn Gluten Meal | 2.21 | 1.57 | 3.78 |
| Cross Linked Soy Bean | 2.37 | 1.65 | 4.02 |
| Crop 2 |  |  |  |
| Treated Corn Gluten Meal | 2.62 | 1.82 | 4.44 |
| Cross Linked Soy Bean | 2.75 | 1.88 | 4.63 |
| Crop 3 |  |  |  |
| Treated Corn Gluten Meal | 2.84 | 1.92 | 4.76 |
| Cross Linked Soy Bean | 2.37 | 2.10 | 4.47 |

EXAMPLE 4

In another commercial scale test, a product made by the procedure of Example 2 was compared to a denatured soy-based supplement which is understood to have been prepared in accordance with the procedure outlined in U.S. Pat. No. 3,942,969. Two separate crops were grown, one supplemented with treated corn gluten meal, and the other with the prior art, denatured soy product. Each of the crops was processed so as to maximize mushroom growth for the supplement being tested.

In the following data (Table II), "supplementation rate" is the supplement addition based on dry compost weight. Yields are in pounds of product per square foot of compost.

TABLE II

| Supplement | CROP A Treated Corn Gluten Meal | CROP B Denatured Soy |
|---|---|---|
| Compost dry wt. (lbs/ft$^2$) | 5.0 | 5.3 |
| Supplementation Rate (%) | 3.86 | 4.5 |
| First Break | 2.16 | 1.84 |
| Second Break | 1.69 | 1.62 |
| Third Break | 0.86 | 0.92 |
| Fourth Break | 0.41 | 0.36 |
| Total Yield | 5.10 | 4.73 |

At a lower rate of supplementation, the treated corn gluten meal out-yielded the denatured soy material.

EXAMPLE

Commercially available compost and mushroom spawn were used in a small, laboratory-scale crop test. Individual boxes, approximately 12 inches wide, 12 inches deep and 24 inches long, were filled with a mixture of compost, supplement and spawn and placed on shelves in a closed room. The room had temperature and ventilation controls such that the environment could be made to simulate conditions on a commercial farm.

The product prepared by the procedures outlined in Example 2 was compared with the same denatured soy-based supplement referred to in Example 4 in a crop test. The supplementation rates set out in Table III are based on dry compost weight, and yields are based on square feet of compost surface.

TABLE III

| Supplement | Treated Corn Gluten Meal | Denatured Soy |
|---|---|---|
| Compost dry wt. (lbs/ft$^2$) | 6.25 | 6.25 |
| Supplementation Rate (%) | 4 | 6 |
| Total Yield (lbs/ft$^2$) | 3.92 | 4.22 |

Relative to the denatured soy product, treated corn gluten meal yielded 7% less weight of mushrooms but at 33% less supplementation rate.

EXAMPLE 6

Using the procedure of Example 1, a phosphate cross-linked modified corn starch was applied to corn gluten meal at three levels of add-on. Following this treatment, each sample of treated meal was dried to 9–12% moisture and packaged separately.

| Batch | % Starch Add-On |
|---|---|
| A | 5 |
| B | 10 |
| D | 3 |

EXAMPLE 7

The products prepared according to Example 6 were used in a laboratory scale crop test and compared to the denatured soy product described in Example 4. The results of this laboratory-scale crop testing are set out in Table IV.

TABLE IV

| Supplement | CROP 1 Product A of Ex. 6 | CROP 2 Product B of Ex. 6 | CROP 3 Product D of Ex. 6 | CROP 4 Denatured soy |
|---|---|---|---|---|
| Compost dry wt (lbs/ft$^2$) | 6.5 | 6.5 | 6.5 | 6.5 |
| Suppl. Rate (%) | 4 | 4 | 4 | 6 |
| Total Yield (lbs/ft$^2$) | 5.78 | 5.45 | 5.30 | 5.21 |

Product A, made with 5% starch add-on, was best on a yield basis; and all three treated corn gluten meal products out-yielded the prior art denatured soy product.

EXAMPLE 8

A carbohydrate coating composition was prepared from a highly thinned hydroxyethyl corn starch (Pencote ®). The starting material was adjusted to approximately 32% solids -- 18.0 Baume, temperature corrected to 60° F. Approximately 7 gallons of the starch starting material was cooked in a scraped surface heat exchanger, which was equipped with a rotating scraper which operates to clean the heat exchanger surface of any film which would retard the transfer of heat.

As illustrated in the following table, the viscosity of the starch solution initially increased to approximately 7600 centipoise (measured using a Brookfield RVF viscometer at 20 r.p.m.), and then gradually decreased.

| Slurry Temperature | Brookfield Viscosity Centipoise |
|---|---|
| 136 F | 800 cps |
| 141 F | 4200 cps |
| 159 F | 7600 cps |
| 165 F | 5800 cps |
| 169.2 F | 4350 cps |
| 169.6 F | 4000 cps |
| 171 F | 3700 cps |
| 179 F | 2300 cps |

The heating process was continued until the viscosity was less than 2,000 cps.

A pilot plant paddle blender was filled with 300 lbs. of a commercial corn gluten meal having approximately 60% protein (as is) and an initial moisture content of 10–12%.

Forty-seven (47) lbs. of the foregoing cooked starch paste (32% dry solids) were transferred to a positive displacement pump feed tank. The pump was used to pump the paste through a sixteen mesh strainer to the paddle blender where it was sprayed onto the corn gluten meal substrate through a HVV 8002 spray nozzle made by Spraying Systems, Inc.. The paste was sprayed over a 25–30 minute period at a rate of approximately 0.2 gals. per minute, and a pressure of 150 psig or greater. After the spraying operation was completed, the treated material was maintained in the paddle blender for an additional twenty minutes to ensure uniformity. The moisture level of the resultant material was measured and found to be 19.3%. The material was then transferred to a tray dryer and the moisture content was further reduced to the 10–12% range.

EXAMPLE 9

Utilizing a procedure similar to Example 8, a 18.0 Baume starch slurry of oxidized corn starch was slowly heated in a scraped surface heat exchanger. When the slurry temperature reached 148° F., the viscosity of the partially cooked starch paste was measured and found to be 320 centipoise. At this point, the cooking operation was discontinued.

Corn gluten meal (240 pounds) was coated with 37.5 pounds of the above-described starch slurry utilizing the same general procedure as described in Example 8. Midway during the coating operation the viscosity of the starch solution was measured and was found to be 800 centipoise.

The starch-coated corn gluten meal was dried to a moisture level of 12.2%.

EXAMPLE 10

Utilizing a procedure similar to Example 8, an 18.0 Baume starch slurry (Douglas 7160) was heated in a scraped surface heat exchanger until the paste viscosity was the consistency of heavy cream. The cooked starch paste (40 pounds) was sprayed onto 255 pounds of corn gluten meal in the manner of Example 8. Midway during the spraying operation, the starch paste viscosity was measured and found to be 250 centipoise.

The starch-coated corn gluten meal was dried to a moisture content in the range of 10–12%.

EXAMPLE 11

The starch-coated corn gluten meal supplements of Examples 2, 8, 9 and 10 were utilized in a laboratory-scale crop test. These four carbohydrate-coated, non-denatured corn meal products were compared with a commercial, formaldehyde denatured soy bean-based mushroom nutrient supplement which is understood to have been prepared in accordance with the procedure of U.S. Pat. No. 3,942,969.

In order to ensure that the growing conditions were similar, all five nutrient supplements were utilized on mushroom crops grown in the same room, at the same time, utilizing the identical compost. The compost employed had a dry weight of 6.25 pounds per square foot. The crop area was 5.5 square feet for each of the mushroom crops.

The four starch-coated corn gluten meal supplements were applied to the compost beds at a rate of 4% based on the dry weight of the compost. The commercial soy bean-based supplement was applied at a rate of 6% by weight, based on the dry weight of the compost.

The results of the crop testing are set-out in Table V.

TABLE V

| | | Crop Yield (gms) | | | |
|---|---|---|---|---|---|
| Day | Soy-based Supplement | Example 2 | Example 8 | Example 9 | Example 10 |
| 0* | 106 | 666 | 695 | 220 | 393 |
| 4 | 822 | 4698 | 4241 | 5425 | 5311 |
| 5 | 2611 | 0 | 0 | 0 | 0 |
| 6 | 0 | 720 | 946 | 255 | 145 |
| 8 | 149 | 570 | 992 | 421 | 565 |
| 10 | 775 | 3666 | 923 | 1579 | 2275 |
| 11 | 0 | 347 | 562 | 0 | 1144 |
| 12 | 1700 | 0 | 0 | 2390 | 0 |
| 14 | 273 | 374 | 35 | 64 | 144 |
| 17 | 184 | 181 | 320 | 127 | 137 |
| 21 | 650 | 428 | 512 | 1138 | 470 |
| Total Grams | 7250 | 11650 | 9516 | 11619 | 10584 |
| Total Pounds | 15.98 | 25.88 | 20.98 | 25.62 | 23.33 |
| Cum. lbs/ft.$^2$ | 3.83 | 6.16 | 5.03 | 6.14 | 5.60 |

*Day 0 = date of first harvesting.

The data illustrate that the crops treated with embodiments of the nutrient supplement of the present invention greatly outperformed the crop treated with a prior art material. However, the commercial soy beanbased product was severely disadvantaged in the foregoing testing since the crop treated with this material had not reached its optimum level of growth at the time of pinning (flushing the crop with fresh air and lowering the temperature). Because the crops utilizing the corn gluten meal supplement had reached their optimum state, it was decided to pin the crops at this point.

Example 4 shows a side-by-side comparison of the prior art soy supplement with the carbohydrate-coated material of Example 2 wherein the crops were grown separately, and growing conditions could be regulated to maximize mushroom growth.

The foregoing data suggests, however, that the time to develop a first flush of mushrooms is significantly faster with the products of the present invention than with the soy-based nutrient.

EXAMPLE 12

In a procedure utilizing commercial quantities of materials and larger equipment, 350 gallons of 18.0 Baume (32% dry substance) starch slurry were prepared using the acid modified, phosphate cross-linked starch described in Example A. This starch slurry was circulated through a scraped surface heat exchanger and slowly heated until the starch started to gelatinize. The initial gelatinization or cooking temperature for this starch was between 158-162° F. The starch was allowed to L- partially cook until the viscosity increased to the 700-1500 cps range. The starch paste was then cooled and maintained at 150° F until it was needed to coat corn gluten meal.

The flowrate of corn gluten meal to be coated was controlled at 3000 pounds per hour by a weigh belt feeder and delivered to a high speed multi-paddle mixer blender. Simultaneously, the previously-prepared partially cooked starch paste was introduced into the mixer blender through a side injection port. The flowrate of the partially cooked starch paste was controlled in proportion to the flowrate of the corn gluten meal and was set to deliver 5.0% dry starch, based on the weight of the corn gluten meal. The multi-paddle mixer blender, operating at 2400 rpm, quickly distributed the starch paste and evenly coated the corn gluten meal. The coated corn gluten meal was then directed to a fluidized bed dryer where the moisture content was reduced to the 10-12% range.

The foregoing specific examples are provided for purposes of illustration only and it will be apparent to one of ordinary skill in the art that many changes and modifications can be made thereto. Therefore, the scope of the invention is to be limited solely by the appended claims.

What is claimed is:

1. A medium for growing mushrooms comprising:
    (a) composted organic materials;
    (b) mushroom mycelia;
    (c) casing materials; and
    (d) hydrophilic granular nutrient supplement particles each comprising an inner core and an outer hydrophilic coating wherein said inner core comprises 75-99% by weight of said particle and consists essentially of a granular proteinaceous material selected from the group consisting of casein, whey, cottonseed meal, soybean meal, soy protein, corn gluten feed, corn gluten meal and wheat gluten; and
    said outer hydrophilic coating comprises 1-25% by weight of said particle and comprises hydrophilic starch coated on the surface of said inner core.

2. The medium of claim 1 wherein the amount of nutrient supplement comprises 1.4 to 14% of the dry weight of said composted organic materials and mushroom mycelia.

3. The nutrient supplement of claim 1 wherein said aqueous coating composition has a viscosity in the range of 250-2500 centipoise.

4. The nutrient supplement of claim 1 wherein said starch solids are heated to a temperature range of 150-160° F.

5. The medium of claim 1 wherein said granular proteinaceous material is non-denatured.

6. The medium of claim 1 wherein said granular material has a moisture content of less than 20%.

7. The medium of claim 1 wherein said nutrient supplement further includes a microial inhibiting compound.

8. The medium of claim 1 wherein said starch is partially pasted.

9. The medium of claim 1 wherein said hydrophilic starch is selected from the group consisting of acid modified starch, starch derivatives and acid modified starch derivatives.

10. The medium of claim 1 wherein said hydrophilic starch comprises an acid modified, phosphate cross-linked, partially cooked starch.

11. In a process for growing mushrooms in a non-sterilized compost bed wherein said bed contains mushroom mycelia and an added nutrient supplement, the improvement comprising:
    adding to said bed up to the time of casing hydrophilic nutrient supplement particles each comprising an inner core and an outer hydrophilic coating wherein said inner core comprises 75-99% by weight of said particle and consists essentially of a granular proteinaceous material selected from the group consisting of casein, whey, cottonseed meal, soybean meal, soy protein, corn gluten feed, corn gluten meal and wheat gluten; and said outer hydrophilic coating comprises 1-25% by weight of said particle and comprises hydrophilic carbohydrate coating on the surface of said inner core, said coating being the residuum of an aqueous coating composition having a viscosity of between 100 to 10,000 centipoise and prepared by heating a starch slurry containing up to 40% by weight starch solids to a temperature in the range 145–175° F., until the slurry becomes semi-pasted.

12. The process of claim 1 wherein said granular proteinaceous material is non-denatured.

13. The process of claim 1 wherein said granular material has a moisture content of less than 20%.

14. The process of claim 1 wherein said nutrient supplement further includes a microbial inhibiting compound.

15. The process of claim 1 wherein said stratch is partially pasted.

16. The process of claim 1 wherein said hydrophilic starch is selected from the group consisting of acid modified starch, starch derivatives and acid modified starch derivatives.

17. The process of claim 1 wherein said hydrophilic starch comprises an acid modified, phosphate cross-linked, partially cooked starch.

* * * * *

UNITED STATES PATENT AND TRADEMARK OFFICE
CERTIFICATE OF CORRECTION

PATENT NO. : 4,990,173

DATED : February 5, 1991

INVENTOR(S) : Katz, et al.

It is certified that error appears in the above-identified patent and that said Letters Patent is hereby corrected as shown below:

Column 2, line 1, "no" should be --not--.

Column 3, line 63, "proteinrich" should be --protein-rich--.

Column 3, line 67, "pastuerization" should be --pasteurization--.

Column 4, line 46, "etc.." should be --etc.--.

Column 5, line 24, "carbo-hydrate-containing" should be --carbohydrate-containing--.

Column 5, line 35, "etc.." should be --etc.--.

Column 6, line 52, after "application" insert --.-- (a period).

Column 7, line 11, after "Example A" insert --.-- (a period).

Column 8, line 33, after "EXAMPLE" insert --5--.

Column 10, line 1, "Inc.." should be --Inc.--.

Column 11, line 12, Table V, Day 14, Example 8, "35" should be --325--.

Column 11, line 13, Table V, Day 17, Soy-based Supplement, "184" should be --164--.

Column 11, line 15, Table V, Total Pounds, Example 2, "25.88" should be --25.68--.

Column 11, line 52, after "to" delete "L-".

UNITED STATES PATENT AND TRADEMARK OFFICE
CERTIFICATE OF CORRECTION

PATENT NO. : 4,990,173

DATED : February 5, 1991

INVENTOR(S) : Katz, et al.

It is certified that error appears in the above-identified patent and that said Letters Patent is hereby corrected as shown below:

Column 12, line 11, before "(a)" delete "pol".

Column 12, line 30, "claim 1" should be --claim 2--.

Column 12, line 33, "claim 1" should be --claim 2--.

Column 13, line 9, "claim 1" should be --claim 11--.

Column 13, line 11, "claim 1" should be --claim 11--.

Column 14, line 1, "claim 1" should be --claim 11--.

Column 14, line 4, "claim 1" should be --claim 11--.

Column 14, line 4, "stratch" should be --starch--.

Column 14, line 6, "claim 1" should be --claim 11--.

Column 14, line 10, "claim 1" should be --claim 11--.

Signed and Sealed this

Eighth Day of September, 1992

*Attest:*

DOUGLAS B. COMER

*Attesting Officer*     *Acting Commissioner of Patents and Trademarks*